United States Patent
Oyama et al.

(10) Patent No.: US 9,452,760 B2
(45) Date of Patent: Sep. 27, 2016

(54) DRIVING CONTROL APPARATUS FOR VEHICLE

(71) Applicant: FUJI JUKOGYO KABUSHIKI KAISHA, Tokyo (JP)

(72) Inventors: Hajime Oyama, Tokyo (JP); Masato Mizoguchi, Tokyo (JP); Yasushi Takaso, Tokyo (JP); Koji Matsuno, Tokyo (JP); Shiro Ezoe, Tokyo (JP); Satoru Akiyama, Tokyo (JP); Eiichi Shiraishi, Tokyo (JP); Takayuki Nagase, Tokyo (JP); Harunobu Horiguchi, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/856,434

(22) Filed: Sep. 16, 2015

(65) Prior Publication Data

US 2016/0090100 A1 Mar. 31, 2016

(30) Foreign Application Priority Data

Sep. 29, 2014 (JP) ................................ 2014-198891

(51) Int. Cl.
*B60W 50/02* (2012.01)
*B60W 10/20* (2006.01)
*B60W 10/18* (2012.01)

(52) U.S. Cl.
CPC .......... *B60W 50/0225* (2013.01); *B60W 10/18* (2013.01); *B60W 10/20* (2013.01)

(58) Field of Classification Search
None
See application file for complete search history.

(56) References Cited

U.S. PATENT DOCUMENTS

| | | | |
|---|---|---|---|
| 5,816,669 A * | 10/1998 | Hiwatashi | B60T 8/1755 303/122 |
| 8,423,257 B2 * | 4/2013 | Ellis | B60T 7/12 701/70 |
| 2001/0032748 A1 * | 10/2001 | Demerly | B60T 8/1755 180/402 |
| 2002/0189889 A1 * | 12/2002 | Demerly | B60T 8/1755 180/402 |
| 2004/0090117 A1 * | 5/2004 | Dudeck | B60T 7/22 303/191 |
| 2005/0115753 A1 | 6/2005 | Pemberton et al. | |

(Continued)

FOREIGN PATENT DOCUMENTS

| | | |
|---|---|---|
| JP | S63-314617 A | 12/1988 |
| JP | 2003-063373 A | 3/2003 |

(Continued)

OTHER PUBLICATIONS

Examination Result German Patent Application No. 10 2015 115 792.6 dated Jun. 15, 2016 with English translation.

*Primary Examiner* — Rami Khatib
*Assistant Examiner* — Navid Ziaeianmehdizadeh
(74) *Attorney, Agent, or Firm* — McDermott Will & Emery LLP

(57) ABSTRACT

During a self-driving control, when an acquisition failure occurs in traveling environment information acquisition required for performing self-driving, and a failure of a steering system of a vehicle equipped with the vehicle driving control apparatus is detected, a brake controller sets an evacuation course along which the vehicle is to travel safely within traveling environment, based on traveling environment information detected last time before the acquisition failure of the traveling environment information, and executes a deceleration of the vehicle and a yaw brake control that applies a yaw moment to the vehicle based on the evacuation course.

18 Claims, 6 Drawing Sheets

(56) References Cited

U.S. PATENT DOCUMENTS

| | | | |
|---|---|---|---|
| 2006/0015231 A1* | 1/2006 | Yoshimura | B60K 6/46 701/48 |
| 2006/0100766 A1* | 5/2006 | Schwarz | B60T 8/1755 701/71 |
| 2010/0076650 A1* | 3/2010 | Spadafora | B62D 5/003 701/43 |
| 2010/0174442 A1* | 7/2010 | Nishimori | B62D 5/0472 701/31.4 |
| 2012/0283907 A1* | 11/2012 | Lee | B60T 8/17557 701/31.9 |
| 2015/0298694 A1* | 10/2015 | Park | B60W 30/12 701/41 |

FOREIGN PATENT DOCUMENTS

| | | |
|---|---|---|
| JP | 3728823 B2 | 12/2005 |
| JP | 4982353 B2 | 7/2012 |

* cited by examiner

DRIVING CONTROL APPARATUS FOR VEHICLE

CROSS-REFERENCE TO RELATED APPLICATION

The present application claims priority from Japanese Patent Application No. 2014-198891 filed on Sep. 29, 2014, the entire contents of which are hereby incorporated by reference.

BACKGROUND

1. Technical Field

The present disclosure relates to a driving control apparatus for a vehicle that recognizes traveling environment, detects traveling information on the vehicle provided, and performs a self-driving control.

2. Related Art

Recently, various vehicles utilizing technologies of self-driving have been developed and proposed so that vehicle operators can operate the vehicles more safely and more comfortably. For example, Japanese Unexamined Patent Application Publication (JP-A) No. 2003-063373 discloses a technology of an automatic retracting device for vehicles. When a failure occurs in a steering system of the vehicle, the automatic retracting device controls braking forces applied to left and right wheels, respectively to change the traveling course of the vehicle, and stops the vehicle within a predetermined evacuating area.

SUMMARY OF THE INVENTION

The technology of the automatic retracting device for vehicles disclosed in JP-A No. 2003-063373 is configured to always search a plurality of evacuating area candidates, select one of the evacuating areas when the failure occurs in the steering system, and control a yaw brake which decelerates the traveling vehicle and applies yaw moment(s) to the vehicle based on a spatial relationship between the evacuating area and the vehicle. However, when information on traveling environment cannot be acquired or an accuracy of detecting the traveling environment information is reduced due to some failure (e.g., a malfunction of a detection instrument, such as a camera or a radar, or bad weather, etc.), it becomes difficult to acquire the spatial relationship between the evacuating area and the traveling vehicle. Thus, the vehicle cannot be evacuated to the evacuating area, and thereby safety of the vehicle may not be ensured.

It is desirable to provide a driving control apparatus for a vehicle that can certainly guide a vehicle to a safe evacuation point to ensure safety of the vehicle during a self-driving control, even if a failure occurs in a steering system under a situation where traveling environment information cannot be acquired.

According to one aspect of the present disclosure, a driving control apparatus for a vehicle is provided, which includes a traveling environment information acquirer that acquires information on traveling environment where a vehicle travels, and a traveling information detector that detects traveling information of the vehicle. A self-driving control is executed based on the traveling environment information and the traveling information. The apparatus includes an environment information acquisition failure detector that detects an acquisition failure of the traveling environment information acquirer, a steering system failure detector that detects a failure of a steering system of the vehicle, and a brake controller that sets an evacuation course along which the vehicle is to travel safely within the traveling environment, based on the traveling environment information detected last time before the acquisition failure traveling environment information acquirer when an acquisition failure of the traveling environment information acquirer is detected and the failure of the steering system is detected, during the self-driving control, and executes a deceleration of the vehicle and a yaw brake control that applies a yaw moment to the vehicle based on the evacuation course.

BRIEF DESCRIPTION OF THE DRAWINGS

The present disclosure is illustrated by way of example and not by way of limitation in the figures of the accompanying drawings, in which the like reference numerals indicate like elements and in which:

FIG. 6A illustrates the override determination threshold gain which changes according to [visibility recognized last time]−[traveled distance], and FIG. 6B illustrates the override determination threshold gain which changes according to a distance to a branch road.

DETAILED DESCRIPTION

Hereinafter, one implementation of the present disclosure will be described with reference to the accompanying drawings.

Figure 1:
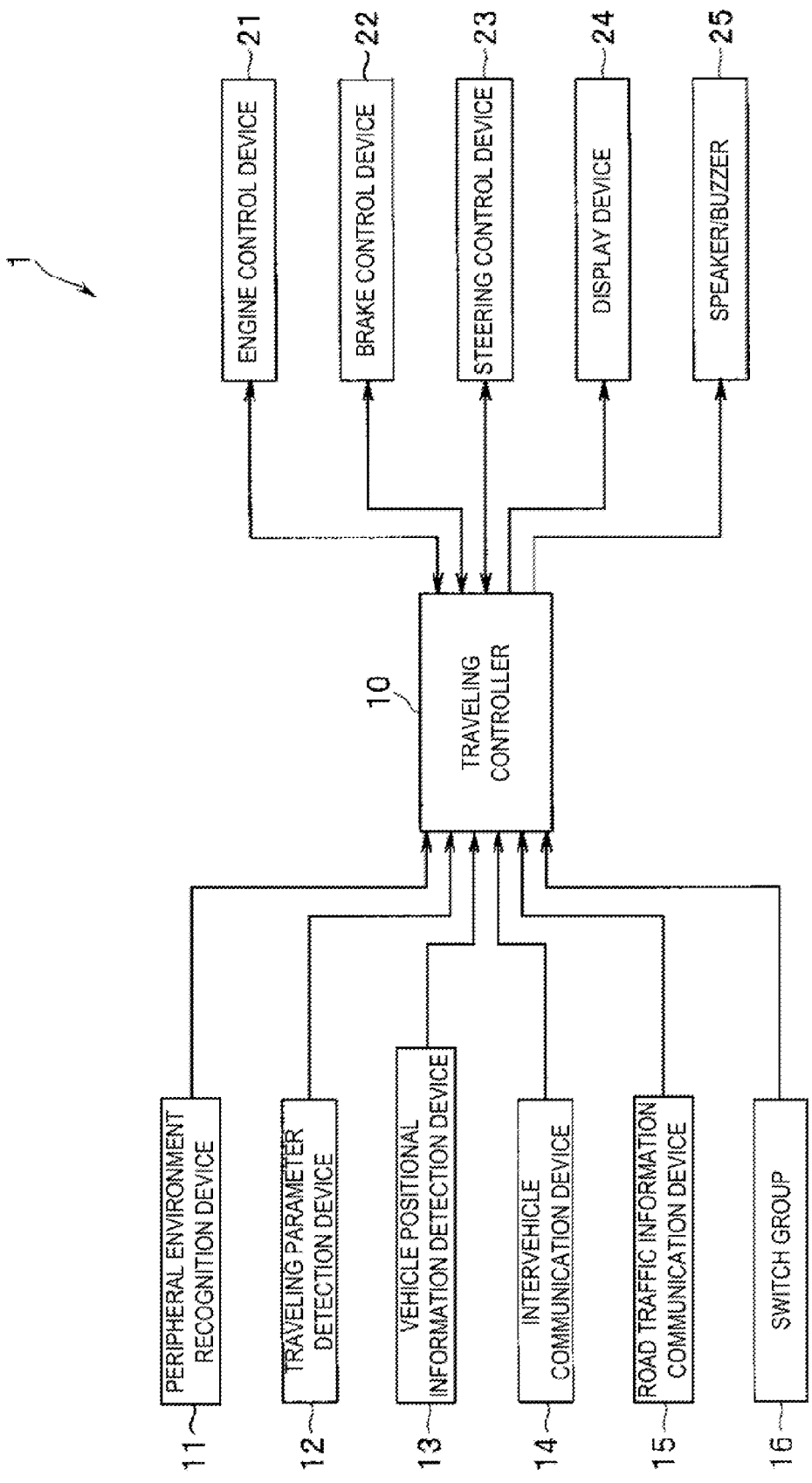
FIG. 1 is a view illustrating the entire configuration of a driving control apparatus for a vehicle according to one implementation of the present disclosure.

In FIG. 1, reference numeral 1 indicates a driving control apparatus for a vehicle. The driving control apparatus 1 includes a traveling controller 10, which is connected with a peripheral environment recognition device 11, a traveling parameter detection device 12, a vehicle positional information detection device 13, an intervehicle communication device 14, a road traffic information communication device 15, and a switch group 16 as input devices. The traveling controller 10 is also connected with an engine control device 21, a brake control device 22, a steering control device 23, a display device 24, and a speaker/buzzer 25 as output devices.

The peripheral environment recognition device 11 is comprised of a camera device (e.g., a stereo camera, a monocular camera, and/or a color camera: not illustrated) provided inside a vehicle cabin and provided with solid state image pickup devices which image environment outside the vehicle to acquire image information, and a radar device (e.g., a laser radar, a millimeter wave radar, and/or an ultrasonic radar: not illustrated) which receives reflected waves from solid objects existing around the vehicle.

The peripheral environment recognition device 11 performs, for example, a well-known grouping processing of distance information based on the image information which is imaged by the camera device, and a comparison of the grouped distance information with predetermined three-dimensional road shape data, solid object data, etc. Therefore, the peripheral environment recognition device 11 extracts relative positions with respect to the vehicle (e.g., distances, angles), such as lane dividing line data, side wall data (e.g., guardrails, curbstones, etc. which exist along a road), solid object data (e.g., other vehicles, etc.) along with velocities.

Further, the peripheral environment recognition device 11 detects positions (distances, angles) where reflected solid objects exist, along with velocities, based on the reflected wave information acquired by the radar device. Note that a maximum distance at which the peripheral environment recognition device 11 can recognize an object (e.g., a distance to the solid object, a maximum distance of the lane dividing line away from the vehicle) is referred to as "visibility" in this implementation. Thus, the peripheral environment recognition device 11 is provided as a traveling environment information acquirer cited in the claims in the implementation.

Further, the peripheral environment recognition device 11 outputs an acquisition failure thereof to the traveling controller 10, when the accuracy of the peripheral environment recognition is deteriorated due to, for example, failures of the camera device and/or the radar device, and/or bad weather. In one implementation, the peripheral environment recognition device 11 may serve as an environment information acquisition failure detector.

The traveling parameter detection device 12 detects traveling information on the vehicle, such as a traveling speed V, a steering torque Tdrv, a steering wheel angle θH, a yaw rate γ, an accelerator opening, a throttle opening, a road surface gradient of a traveling road surface, a road surface friction coefficient estimated value, in particular. Thus, the traveling parameter detection device 12 is provided as a traveling information detector cited in the claims in the implementation.

The vehicle positional information detection device 13 is, for example, a known navigation system. For example, the vehicle positional information detection device 13 receives electric waves sent from Global Positioning System (GPS) satellites, detects the current position of the vehicle based on the electric wave information, and identifies the current position on map data stored in advance in a storage device, such as a flash memory, a compact disc (CD), a digital versatile disc (DVD), a Blu-ray® disc, a hard disk drive (HDD).

The map data stored in advance is road data and facility data, for example. Here, the road data includes positional information of links, classification information thereof, and positional information of nodes, classification information thereof, and information of connection relations between the nodes and the links (i.e., branches of roads, junction information, maximum traveling speed information at the branches, etc.). Here, the facility data includes a plurality of records for every facility, and each record has data indicative of name information of a target facility, location information, and a facility classification (a classification of any one of a department store, a store, a restaurant, a parking lot, a park, and a repair base for broken vehicles) information. If a destination is inputted by a vehicle operator after the vehicle position is displayed on the map, a course from the original position to the destination is calculated by a predetermined way and is displayed on the display device 24, such as a display and a monitor, and an audio assistance is carried out by the speaker/buzzer 25 so that a navigational guidance is possible. Thus, the vehicle positional information detection device 13 is provided as the traveling environment information acquirer cited in the claims in the implementation.

The intervehicle communication device 14 is comprised of, for example, a short-range radio communication device, such as a wireless LAN device, having a coverage of about 100 m. Thus, the intervehicle communication device 14 can directly communicate with other vehicles for transceiving information without a server etc. intervening. The vehicle information, the traveling information, the traffic environment information, etc. are exchanged by the two-way communications with other vehicles. The vehicle information includes unique information indicative of a type of vehicle (e.g., a passenger car, a truck, and a motorcycle). The traveling information includes a traveling speed, positional information, lighting information of stop lamps, blinking information of blinkers transmitted when the vehicle turns to the left or right, and blinking information of hazard lamps which blink at the time of an emergency stopping of the vehicle. The traffic environment information includes information which changes with situations, such as road traffic congestion information and construction information. Thus, the intervehicle communication device 14 is provided as the traveling environment information acquirer cited in the claims in the implementation.

The road traffic information communication device 15 is a so-called "Vehicle Information and Communication System (VICS)®," which receives the road traffic information on real time, such as information on traffic congestions and accidents, constructions, required times, and parking lots from transmitters of FM multiplex broadcasts or on roads, and displays these received traffic information over the prestored map data. Thus, the road traffic information communication device 15 is provided as the traveling environment information acquirer cited in the claims in the implementation.

The switch group 16 is a group of switches according to an operation support control for the operator, and is comprised of a switch for causing a traveling control to travel the vehicle at a predetermined fixed speed, a switch for causing a tracking control to maintain an intervehicle distance and time between the vehicle and a leading vehicle at a predetermined constant value, a switch for causing a lane keeping control in which the traveling lane is maintained at a preset lane for the traveling control, a switch for causing a lane deviation preventing control in which a deviation of the vehicle from the traveling lane is prevented, a passing control execution permitting switch for causing a control to pass a leading vehicle (i.e., a passing target vehicle), a switch for causing the self-driving control to cooperate all these controls with each other, switches for setting the traveling speed, the intervehicle distance, the intervehicle time, the speed limit, etc. required for the respective controls, and switches for canceling the respective controls.

The engine control device 21 is, for example, a known control unit which performs primary controls of an engine (not illustrated) of the vehicle, such as a fuel injection control, an ignition timing control, and a control of an electronically-controlled throttle valve, based on an intake air quantity, a throttle opening, an engine coolant temperature, an intake air temperature, an oxygen concentration, a crank angle, an accelerator opening, and other vehicle information.

The brake control device 22 can control, for example, brake devices (not illustrated) of four wheels, independent from a braking operation by the operator, based on a brake switch, rolling speeds of the four wheels, a steering wheel angle θH, a yaw rate γ, and other vehicle information. The brake control device 22 is a known control unit for performing a yaw moment control which controls a yaw moment applied to the vehicle, such as a known antilock brake system (ABS) and a sideslip (skid) prevention control, and a yaw brake control. When a braking force of each wheel is inputted from the traveling controller 10, the brake control device 22 calculates a brake fluid pressure of each wheel based on the braking force, and actuates a brake actuator (not illustrated). Thus, the brake control device 22 is provided along with the traveling controller 10, as a brake controller cited in the claims in the implementation.

The steering control device 23 is, for example, a known control device for controlling an assist torque generated by an electric power steering motor (not illustrated) provided in the steering system of the vehicle based on a traveling speed, a steering torque, a steering wheel angle, a yaw rate, and other vehicle information. The steering control device 23 can perform the lane keeping control for maintaining the traveling lane at the preset lane to control traveling of the vehicle, and the lane deviation preventing control for performing the deviation preventing control from the traveling lane, as described above. The steering angle or the steering torque required for the lane keeping control and the lane deviation preventing control is calculated by the traveling controller 10, and is then inputted into the steering control device 23. The steering control device 23 controls the drive of the electric power steering motor according to the inputted controlled variable. The steering control device 23 is configured to detect failures of the steering system including a steering mechanism, a steering torque sensor, and a steering wheel angle sensor, etc., and the traveling controller 10 monitors such malfunctions. In one implementation, the steering control device 23 may serve as a steering system failure detector.

The display device 24 is a device, such as a monitor, a display, and/or an alarm lamp, which performs visual warning and/or notification to the operator, for example. The speaker/buzzer 25 is a device which performs audio warning and/or notification to the operator. When the failure occurs to any one of the various devices of the vehicle, the display device 24 and/or the speaker/buzzer 25 suitably alarm to the operator.

The traveling controller 10 performs the self-driving control etc. based on the input signals from the devices 11-16 described above by cooperating the collision avoidance control with obstructions etc., the constant speed traveling control, the track traveling control, the lane keeping control, the lane deviation preventing control, the passing control, etc. During the self-driving control, when a failure to the acquisition of the traveling environment information required for the self-driving (e.g., a stop of the image recognition, a deterioration in the reliability of the image recognition, a deterioration in the radar wave transceiving function, etc.) occurs, and if a failure of the steering system of the vehicle is detected, an evacuation course along which the vehicle is to travel safely is set within traveling environment based on the traveling environment information detected last time by the traveling environment information acquirer before the failure occurs, and the brake control device 22 is caused to execute the deceleration of the vehicle and the yaw brake control which applies the yaw moment to the vehicle, based on the evacuation course. Thus, the traveling controller 10 is provided along with the environment information acquisition failure detector and the brake control device 22 so as to have the function of the brake controller.

Figure 2:
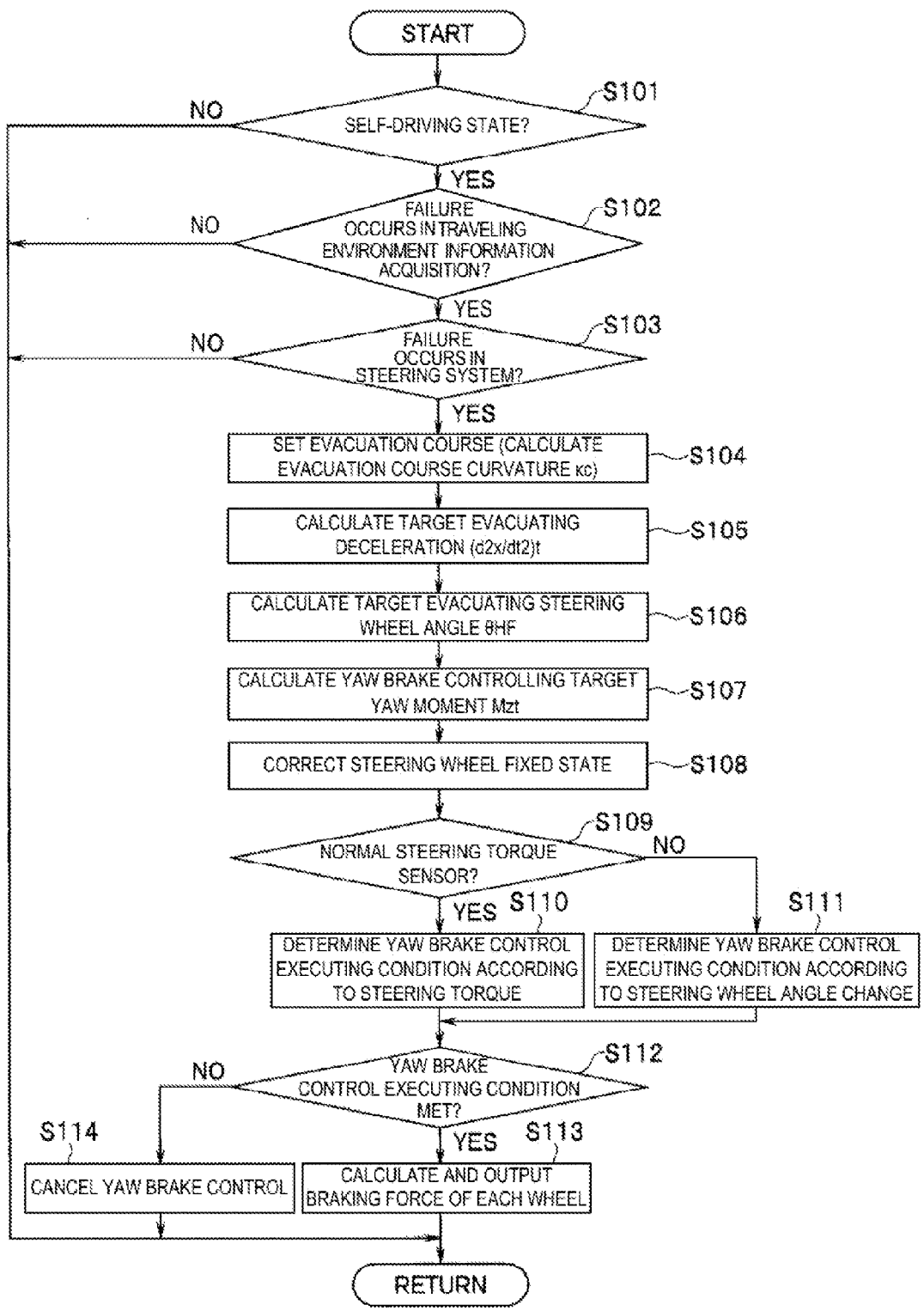
FIG. 2 is a flowchart illustrating an emergency evacuation control during a self-driving control according to one implementation of the present disclosure.

Next, the emergency evacuation control in the self-driving control which is executed by the traveling controller 10 is described with reference to a flowchart of FIG. 2.

First, at Step (hereinafter, abbreviated as "S") 101, the traveling controller 10 determines whether it is in a self-driving state where the self-driving control is executed. If it is not in the self-driving state, the traveling controller 10 escapes from this program, and, on the other hand, if it is in the self-driving state, the traveling controller 10 transits to S102 to determine whether any failure (e.g., the stop of the image recognition, the deterioration in the reliability of the image recognition, the deterioration in the radar wave transceiving function, etc.) occurs in the traveling environment information acquisition required for executing the self-driving.

If the traveling environment information acquisition is normal as the result of the determination at S102, the traveling controller 10 escapes from the program, and, on the other hand, if the failure occurs in the traveling environment information acquisition, the traveling controller 10 transits to S103.

When the traveling controller 10 transits to S103, it determines whether any failure of the steering system is detected. If the failure of the steering system is not detected, the traveling controller 10 escapes from the program, and, on the other hand, if the failure of the steering system is detected, the traveling controller 10 transits to S104.

Figure 3:
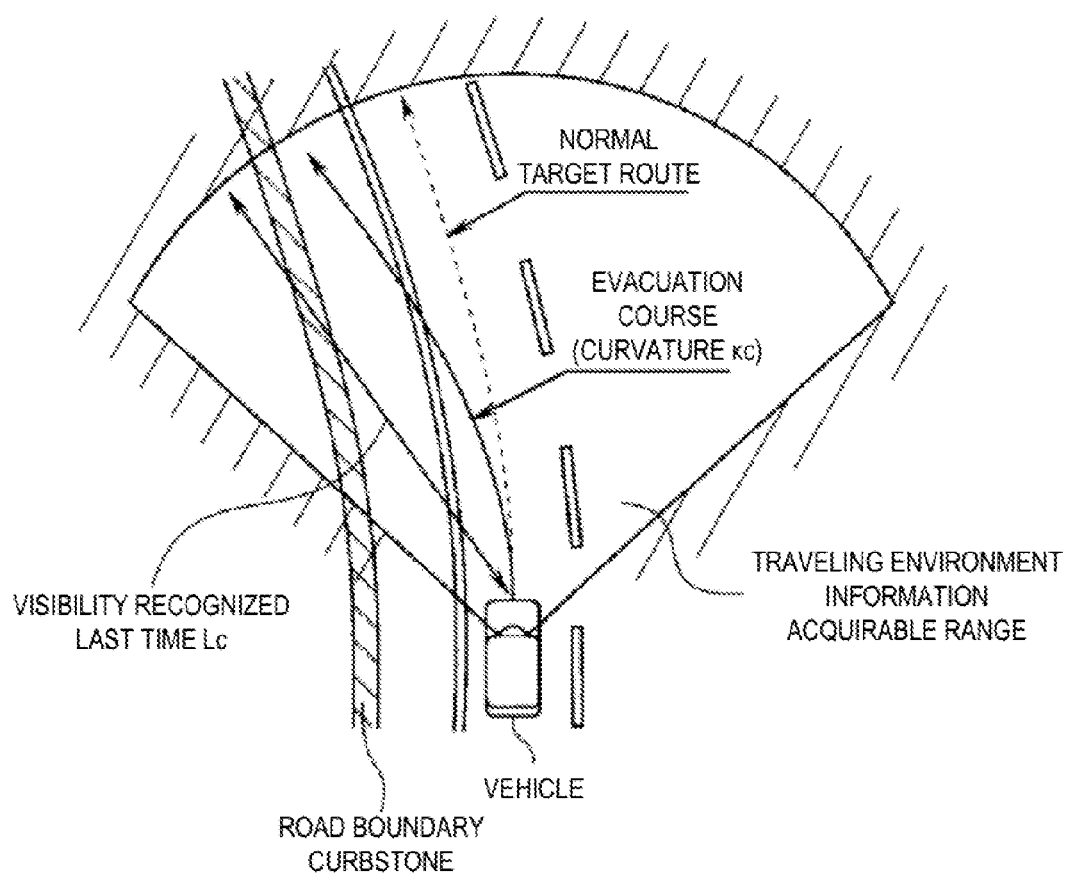
FIG. 3 is a diagram illustrating one example of the emergency evacuation control according to one implementation of the present disclosure.

If the traveling controller 10 transits to S104, the evacuation course is set within a traveling environment information acquirable range which is detected last time before the acquisition failure of the traveling environment information. Specifically, as illustrated in FIG. 3, within the traveling environment information acquirable range which is detected last time before the acquisition failure of the traveling environment information, a course to a traveling position at which the vehicle can safely stop at a road shoulder without the vehicle colliding any obstruction, such as a road boundary curbstone or a stopping vehicle (i.e., another vehicle) is set as the evacuation course, and a curvature κc of the evacuation course is calculated. In one example of FIG. 3, if the traveling environment information acquisition and the steering system are normal in a left curve, the evacuation course takes a target route along the curved road as illustrated by a dashed line in this drawing. However, if the traveling environment information acquisition and the steering system are in failure, another example is illustrated in which another evacuation course along which the vehicle travels toward a left road shoulder at an inner side of the curve as illustrated by a solid line is set. Note that reference character Lc in this drawing illustrates the visibility recognized last time.

Here, for example, the evacuation course is expressed in two-dimensional coordinates (e.g., x-y coordinates: a longitudinal direction of the vehicle is x-direction, and a lateral direction is y-direction), and the curvature κc of the evacuation course is approximated per point which constitutes the evacuation course, by using a coefficient of a quadratic term calculated by a quadratic least square method. For example, if the evacuation course is approximated by a quadratic expression of $y = a \cdot x^2 + b \cdot x + c$, a value of $2 \cdot a$ can be approximated as a curvature component.

Note that in the example of FIG. 3, although no obstruction etc. is illustrated at the road shoulder, if an obstruction etc. exists at the road shoulder, the evacuation course is set within a distance before the obstruction.

Next, when the traveling controller 10 transits to S105, a target evacuating deceleration $(d^2x/dt^2)t$ is calculated, for example, by the following Formula (1).

$$(d^2x/dt^2)t = V0^2/(2 \cdot Lc) \quad (1)$$

Here, V0 is a traveling speed when the traveling environment information acquisition and the steering system are determined to be in failure. Note that the target evacuating deceleration $(d^2x/dt^2)t$ may be set greater so that the vehicle can stop certainly within the traveling environment information acquirable range which is detected last time.

Next, the traveling controller 10 transits to S106, for example, to calculate a target evacuating steering wheel angle θHF required for the vehicle traveling along the set evacuation course, by the following Formula (2).

$$\theta HF = (1 + A \cdot V^2) \cdot 1 \cdot n \cdot \kappa c \quad (2)$$

Here, A is a stability factor unique to each vehicle, 1 is a wheel base, and n is a steering gear ratio.

Next, the traveling controller 10 transits to S107, for example, to calculate a yaw moment (a yaw brake controlling target yaw moment) Mzt applied to the vehicle by the brake control device 22, by the following Formula (3).

$$Mzt = (2 \cdot 1 \cdot Kf \cdot Kr)/(Kf + Kr) \cdot (\theta H\_vdc/n) \quad (3)$$

Here, Kf is an equivalent cornering power of front wheels, and Kr is an equivalent cornering power of rear wheels. Further, θH_vdc is a steering wheel angle further required for traveling along the set evacuation course, and θH_vdc=θHF−θH0 (θH0 is a steering wheel angle when the traveling environment information acquisition and the steering system are determined to be in failure). Note that when θH0 changes due to the failure of the steering system, the yaw brake controlling target yaw moment Mzt is calculated using the steering wheel angle θH detected every moment (i.e., as θH_vdc=θHF−θH).

Next, the traveling controller 10 transits to S108, for example, to execute a steering wheel fixed state correction by the following Formula (4).

$$Mzt = Mzt \cdot Kbm \quad (4)$$

Figure 4:
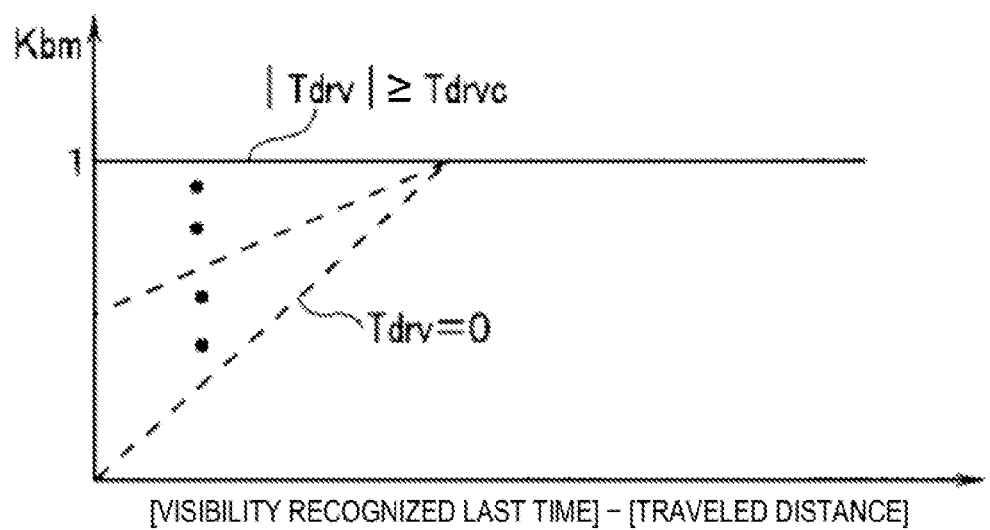
FIG. 4 is a graph illustrating characteristics of a correction coefficient in a steering wheel fixed state according to one implementation of the present disclosure.

Here, Kbm is a steering wheel fixed state correction coefficient which is determined in advance by experiments, calculations, etc., and the steering wheel fixed state correction coefficient Kbm is set, for example, in a map illustrated in FIG. 4.

Hereinafter, characteristics of the steering wheel fixed state correction coefficient Kbm will be described.

First, a vehicle maneuver when the operator operates or fixes the steering wheel is given by the following Formulas (5) and (6).

$$2 \cdot (Kf + Kr) \cdot \beta + (m \cdot V + (2/V) \cdot (lf \cdot Kf - lr \cdot Kr)) \cdot \gamma = 2 \cdot Kf \cdot \delta \quad (5)$$

$$2 \cdot (lf \cdot Kf - lr \cdot Kr) \cdot \beta + (2 \cdot (lf^2 \cdot Kf + lr^2 \cdot Kr)/V) \cdot \gamma = 2 \cdot lf \cdot Kf \cdot \delta + Mz \quad (6)$$

Here, m is a mass of the vehicle, β is a vehicle body skid angle, δ is a front wheel steering angle, lf is a distance between front axles to the center of gravity of the vehicle, lr is a distance between rear axles to the center of gravity of the vehicle, and Mz is an applied yaw moment.

Based on Formulas (5) and (6), the yaw rate γ can be obtained by the following Formula (7).

$$\gamma = (1/(1 + A \cdot V^2)) \cdot (V/l) \cdot (\delta + ((Kf + Kr)/(2 \cdot l \cdot Kf \cdot Kr)) \cdot Mz) \quad (7)$$

Figure 5:
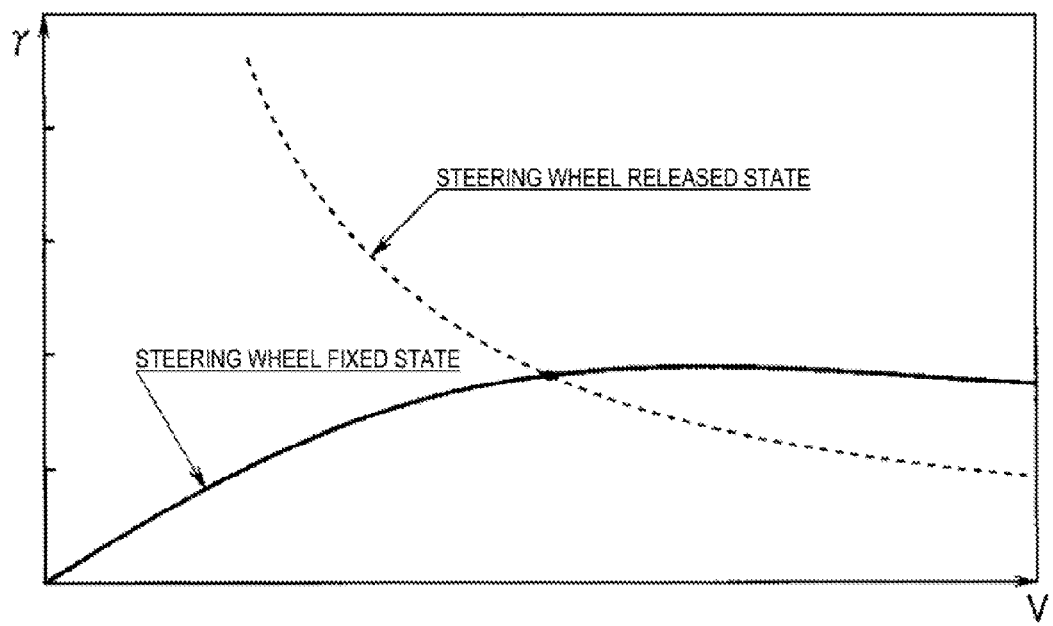
FIG. 5 is a graph illustrating a yaw rate which changes with the steering wheel fixed state according to one implementation of the present disclosure.

One example of the characteristics of the yaw rate γ is illustrated by a solid line in FIG. 5 and, thus, when the operator operates or fixes the steering wheel, the yaw rate which is close to the case of a constant turning radius is applied by the yaw brake control.

On the other hand, when the operator releases his/her hand(s) from the steering wheel, since the front wheels roll freely according to self-alignment torques without producing any lateral force, the vehicle maneuver at this time is given by the following Formulas (8) and (9) where Kf in Formulas (5) and (6) is zero.

$$2 \cdot Kr \cdot \beta + (m \cdot V - (2/V) \cdot Lr \cdot Kr) \cdot \gamma = 0 \quad (8)$$

$$-2 \cdot lr \cdot Kr \cdot \beta + ((2 \cdot l^2 \cdot Kr)/V) \cdot \gamma = Mz \quad (9)$$

Based on Formulas (8) and (9), the yaw rate γ can be obtained by the following Formula (10).

$$\gamma = Mz/(m \cdot lr \cdot V) \quad (10)$$

As illustrated by a dashed line in FIG. 5, the characteristics of the yaw rate γ is such that the yaw moment generated due to the braking force increases rapidly by a self-steering in the turning direction at a low traveling speed when the operator releases his/her hand(s) from the steering wheel.

As apparent also from Formulas (7) and (10), and FIG. 5, when the yaw moment control of the vehicle is carried out by the braking force, the yaw rate γ generated by the yaw moment control differ between the case where the steering angle is fixed and the case where the steering angle changes with the self-alignment torques.

Therefore, as illustrated in the characteristics diagram of FIG. 4, since the vehicle is slowed down and its traveling speed is reduced according to [visibility recognized last time]−[the traveled distance] being shorter (i.e., as the vehicle goes into the second half of the visibility range and travels closer to the evacuating position), the steering wheel fixed state correction coefficient Kbm when the operator does not fix the steering wheel (when Tdrv=0) is reduced so that the yaw brake controlling target yaw moment Mzt is corrected smaller. On the contrary, when it can be presumed that the operator fixes the steering wheel (i.e., |Tdrv|≥Tdrvc; where Tdrvc is a predetermined value), the steering wheel fixed state correction coefficient is set as Kbm=1.

Next, the traveling controller 10 transits to S109 to determine whether the steering torque sensor is normal (including whether the value of the steering torque is correctly acquired, other than just the sensor itself).

As the result of the determination at S109, if determined that the steering torque sensor is normal (and the value of the steering torque is correctly acquired), the traveling controller 10 transits to S110 to determine a yaw brake control executing condition according to the steering torque. The determination of the yaw brake control executing condition according to the steering torque is a determination for preventing the yaw brake control from interfering with the operator's steering operation, and determines that the condition of the yaw brake control is not met when there is a possibility of the interference with the operator's steering operation.

First, within a range where the vehicle approaches the visibility range boundary and there is a high possibility of the steering operation being given back to the operator, the yaw brake control may interfere with the operator's steering operation.

Therefore, the traveling controller 10 determines whether the following Formula (11) is met. If the traveling controller 10 determines that Formula (11) is met, it determines that the condition of the yaw brake control is not met.

$$|Tdrv| > \text{Tover0} \cdot \text{Kover1} \tag{11}$$

Figure 6A:
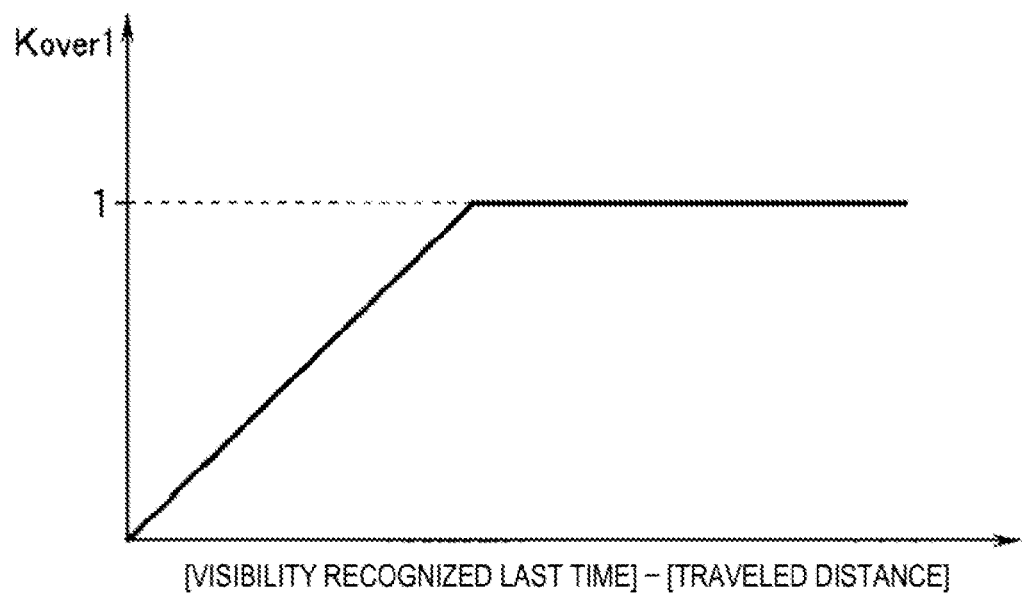
FIGS. 6A and 6B are graphs illustrating an override determination threshold gain according to one implementation of the present disclosure, where

Here, Toyer0·Kover1 is a torque threshold. Tover0 is a normal threshold which is set in advance by experiments, calculations, etc., and Kover1 is, for example, as illustrated in FIG. 6A, an override determination threshold gain which is set smaller as [visibility recognized last time]−[traveled distance] becomes shorter (i.e., as the vehicle slows down and it transits to a stopping state). Thus, as the vehicle slows down and it transits to the stopping state, the torque threshold Toyer0·Kover1 is set smaller so that an override steering carried out by the operator's steering operation becomes easier to be detected.

In addition, the traveling controller 10 determines whether the following Formula (12) is met, and if Formula (12) is met, the traveling controller 10 determines that the condition of the yaw brake control is not met.

$$|Tdrv| > \text{Tover0} \cdot \text{Kover2} \tag{12}$$

Figure 6B:
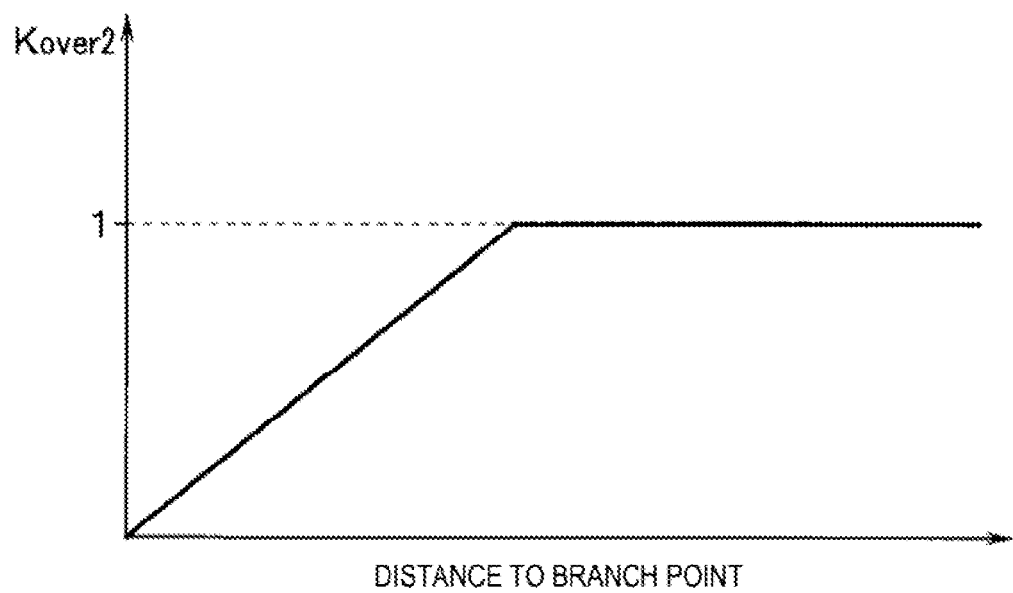

Here, Tover0·Kover2 is a torque threshold. Kover2 is an override determination threshold gain which is, for example, set smaller as a distance to a branch point becomes shorter, as illustrated in FIG. 6B. That is, since there is a high possibility that the operator evacuates to a branch road side when the traveling environment information acquisition failure and the steering system failure occur near the branch road, the torque threshold Tover0·Kover2 in the branch road direction is set smaller near the branch road so that the override steering by the operator's steering operation becomes easier to be detected.

If neither Formula (11) nor Formula (12) is met, i.e., in the case of |Tdrv|≤Tover0·Kover1 and |Tdrv|≤Tover0·Kover2, the traveling controller 10 determines that the yaw brake control executing condition is met.

On the other hand, if the steering torque sensor is determined to be in failure (the value of the steering torque is inappropriate) as the result of the determination at S109 described above, the traveling controller 10 transits to S111 to determine the yaw brake control executing condition according to the steering wheel angle change. That is, since the value of the steering torque may also be inappropriate if the failure exists in the steering system including the steering mechanism, the yaw brake control executing condition is determined using the steering wheel angle change θH_V.

Specifically, the steering wheel angle change θH_V after the traveling environment information acquisition failure and the steering system occur failure is calculated, for example, by the following Formula (13). The condition of the yaw brake control is then determined not to be met when there is the possibility of the interference of the yaw brake control with the operator's steering operation, based on the steering wheel angle change θH_V, similar to the approach at S110 described above.

$$\theta H\_V = \text{Kover}\_p \cdot (\theta H - \theta H0) + \text{Kover}\_i \cdot \int (\theta H - \theta H0) dt + \text{Kover}\_d \cdot d(\theta H - \theta H0)/dt \tag{13}$$

Here, Kover_p is a proportional gain, Kover_i is an integration gain, and Kover_d is a derivative gain.

First, within the range where the vehicle approaches the visibility range boundary and there is a high possibility of the steering operation being given back to the operator, the yaw brake control may interfere with the operator's steering operation.

Therefore, the traveling controller 10 determines whether the following Formula (14) is met. If the traveling controller 10 determines that Formula (14) is met, it determines that the condition of the yaw brake control is not met.

$$|\theta H\_V| > \theta\text{Hover0} \cdot \text{Kover1} \tag{14}$$

Here, θHover0·Kover1 is a steering wheel angle change threshold. θHover0 is a normal threshold which is set in advance by experiments, calculations, etc. As described at S110, Kover1 is, for example, as illustrated in FIG. 6A, an override determination threshold gain which is set smaller as [visibility recognized last time]−[traveled distance] becomes shorter (i.e., as the vehicle slows down and it transits to the stopping state). Thus, as the vehicle slows down and it transits to the stopping state, the steering wheel angle change threshold θHover0·Kover1 is set smaller so that the override steering carried out by the operator's steering operation becomes easier to be detected.

In addition, the traveling controller 10 determines whether the following Formula (15) is met, and if Formula (15) is met, the traveling controller 10 determines that the condition of the yaw brake control is not met.

$$|\theta H\_V| > \theta\text{Hover0} \cdot \text{Kover1} \tag{15}$$

Here, θHover0·Kover2 is a steering wheel angle change threshold. As described at S110, Kover2 is an override determination threshold gain which is, for example, set smaller as the distance to the branch point becomes shorter, as illustrated in FIG. 6B. That is, since there is a high possibility that the operator evacuates to the branch road side when the traveling environment information acquisition failure and the steering system failure occur near the branch road, the steering wheel angle change threshold θHover0·Kover2 in the branch road direction is set smaller near the branch road so that the override steering by the operator's steering operation becomes easier to be detected.

If neither Formula (14) nor Formula (15) is met, i.e., in the case of |θH_V|≤θHover0·Kover1 and |θH_V|≤θHover0·Kover2, the traveling controller 10 determines that the yaw brake control executing condition is met.

When the execution determining processing of the yaw brake control is executed at S110 or S111, the traveling controller 10 transits to S112, it determines whether the executing condition of the yaw brake control is met, i.e., whether |Tdrv|≤Tover0·Kover1 and |Tdrv|≤Tover0·Kover2, or |θH_V|≤θHover0·Kover1 and |θH_V|≤θHover0·Kover2.

If the executing condition of the yaw brake control is met as the result of this determination, the traveling controller 10 transits to S113 to calculate a braking force of each wheel (i.e., a braking force Ffi of an inner turning front wheel, a braking force Ffo of an outer turning front wheel, a braking force Fri of an inner turning rear wheel, a braking force Fro of an outer turning rear wheel), for example, by the following Formulas (16)-(19), and then output them to the brake control device 22.

$$Ffi = (dx/2) \cdot Fx + dy \cdot Fy \tag{16}$$

$$Ffo = (dx/2) \cdot Fx - dy \cdot Fy \tag{17}$$

$$Fri = ((1-dx)/2) \cdot Fx + (1-dy) \cdot Fy \tag{18}$$

$$Fro = ((1-dx)/2) \cdot Fx - (1-dy) \cdot Fy \tag{19}$$

Here, dx is a distribution ratio of the front and rear braking forces of the decelerating control ([front wheel braking force]/[total braking force]), and Fx is a total of braking forces and is calculated by the following Formula (20).

$$Fx = -m \cdot (d^2x/dt^2)t \qquad (20)$$

Further, dy is a distribution ratio of front and rear axles of the yaw moment control ([yaw moment of front axle]/[total yaw moment]). Fy is a total of braking force differences of the left and right wheels according to the target yaw moment Mzt, and is calculated by the following Formula (21), where d is a tread.

$$Fy = Mzt/d \qquad (21)$$

On the other hand, if determined that the executing condition of the yaw brake control is not met as the result of the determination at S112, the traveling controller 10 transits to S114 to cancel the yaw brake control and escape from this routine.

As described above, according to the implementation of the present disclosure, during the self-driving control, when the failure occur in the traveling environment information acquisition which is required for performing the self-driving, and the failure of the steering system of the vehicle is detected, based on the last-detected traveling environment information before the acquisition failure of the traveling environment information, the evacuation course along which the vehicle is to travel safely is set within the traveling environment, and the deceleration of the vehicle and the yaw brake control which applies the yaw moment to the vehicle are executed by the brake control device 22 based on the evacuation course. Thus, during the self-driving control, even if the failure occurs in the steering system under the situation where the traveling environment information cannot be acquired, it is possible to certainly guide the vehicle to the safe evacuation point, thereby ensuring the safety of the vehicle. Further, when carrying out an alternative control along the evacuation course by the brake control device 22, the yaw brake controlling target yaw moment Mzt is corrected according to the steering wheel fixed state by the operator to allow the yaw moment control with sufficient accuracy along the evacuation course which is independent from the steering wheel fixed state by the operator. Further, within the range where there is a high possibility of the steering operation being given back to the operator when the vehicle approaches the visibility range boundary or approaches the branch point, the cancellation of the yaw brake control can be performed appropriately by the operator's steering input, thereby preventing the unnecessary interference of the yaw brake control with the operator's steering operation. Therefore, the priority is given to the operator's steering operation to achieve a suitable control.

The invention claimed is:

1. A drive control apparatus configured to execute a self-driving control based on traveling environment information that is information on traveling environment where a vehicle travels and traveling information of the vehicle, and comprising: a traveling environment information acquirer that acquires the traveling environment information; a traveling information detector that detects the traveling information; an environment information acquisition failure detector that detects an acquisition failure of the traveling environment information acquirer; a steering system failure detector that detects a failure of a steering system of the vehicle; and a brake controller that sets an evacuation course along which the vehicle is to travel safely within the traveling environment, based on the traveling environment information detected last time before the acquisition failure of the traveling environment information acquirer, in the case where an acquisition failure of the traveling environment information acquirer is detected and the failure of the steering system is detected, during the self-driving control, and executes a deceleration of the vehicle and a yaw brake control that applies a yaw moment to the vehicle based on the evacuation course.

2. The drive control apparatus according to claim 1, wherein the yaw moment applied to the vehicle by the yaw brake control is corrected according to a steering wheel fixed state by an operator of the vehicle.

3. The drive control apparatus according to claim 2, wherein the yaw moment applied to the vehicle by the yaw brake control is corrected according to a traveled distance of the vehicle based on the evacuation course.

4. The drive control apparatus according to claim 3, wherein the yaw brake control is canceled when a predetermined steering input is performed by the operator.

5. The drive control apparatus according to claim 4, wherein, the steering input by the operator is determined based on a steering torque, and the yaw brake control is canceled when the steering torque inputted is greater than a torque threshold that is set smaller as the traveled distance based on the evacuation course becomes longer.

6. The drive control apparatus according to claim 4, wherein, the steering input by the operator is determined based on a steering wheel angle change, and the yaw brake control is canceled when the steering wheel angle change inputted is greater than a steering wheel angle change threshold that is set smaller as the traveled distance based on the evacuation course becomes longer.

7. The drive control apparatus according to of claim 4, wherein, the steering input by the operator is determined based on a steering torque, and the yaw brake control is canceled when the acquisition failure of the traveling environment information acquirer and the failure of the steering system occur near a branch road, and when the steering torque inputted is greater than a torque threshold that is set smaller as a distance to the branch road becomes shorter.

8. The drive control apparatus according to claim 4, wherein, the steering input by the operator is determined based on the steering wheel angle change, and the yaw brake control is canceled when the acquisition failure of the traveling environment information acquirer and the failure of the steering system occur near a branch road, and the steering wheel angle change inputted is greater than a steering wheel angle change threshold that is set smaller as a distance to the branch road becomes shorter.

9. The drive control apparatus according to claim 2, wherein the yaw brake control is canceled when a predetermined steering input is performed by the operator.

10. The drive control apparatus according to claim 9, wherein, the steering input by the operator is determined based on a steering torque, and the yaw brake control is canceled when the steering torque inputted is greater than a torque threshold that is set smaller as the traveled distance based on the evacuation course becomes longer.

11. The drive control apparatus according to claim 9, wherein, the steering input by the operator is determined based on a steering wheel angle change, and the yaw brake control is canceled when the steering wheel angle change inputted is greater than a steering wheel angle change threshold that is set smaller as the traveled distance based on the evacuation course becomes longer.

12. The drive control apparatus according to claim 9, wherein, the steering input by the operator is determined based on a steering torque, and the yaw brake control is canceled when the acquisition failure of the traveling environment information acquirer and the failure of the steering system occur near a branch road, and when the steering torque inputted is greater than a torque threshold that is set smaller as a distance to the branch road becomes shorter.

13. The drive control apparatus according to claim 9, wherein, the steering input by the operator is determined based on the steering wheel angle change, and the yaw brake control is canceled when the acquisition failure of the traveling environment information acquirer and the failure of the steering system occur near a branch road, and the steering wheel angle change inputted is greater than a steering wheel angle change threshold that is set smaller as a distance to the branch road becomes shorter.

14. The drive control apparatus according to claim 1, wherein the yaw brake control is canceled when a predetermined steering input is performed by an operator.

15. The drive control apparatus according to claim 14, wherein, the steering input by the operator is determined based on a steering torque, and the yaw brake control is canceled when the steering torque inputted is greater than a torque threshold that is set smaller as the traveled distance based on the evacuation course becomes longer.

16. The drive control apparatus according to claim 14, wherein, the steering input by the operator is determined based on a steering wheel angle change, and the yaw brake control is canceled when the steering wheel angle change inputted is greater than a steering wheel angle change threshold that is set smaller as the traveled distance based on the evacuation course becomes longer.

17. The drive control apparatus according to claim 14, wherein, the steering input by the operator is determined based on a steering torque, and the yaw brake control is canceled when the acquisition failure of the traveling environment information acquirer and the failure of the steering system occur near a branch road, and when the steering torque inputted is greater than a torque threshold that is set smaller as a distance to the branch road becomes shorter.

18. The drive control apparatus according to claim 14, wherein, the steering input by the operator is determined based on the steering wheel angle change, and the yaw brake control is canceled when the acquisition failure of the traveling environment information acquirer and the failure of the steering system occur near a branch road, and the steering wheel angle change inputted is greater than a steering wheel angle change threshold that is set smaller as a distance to the branch road becomes shorter.

* * * * *